(12) United States Patent
Evans et al.

(10) Patent No.: US 7,821,753 B2
(45) Date of Patent: Oct. 26, 2010

(54) DC HIGH POWER DISTRIBUTION ASSEMBLY

(75) Inventors: Glen Allen Evans, Garwood, NJ (US); Richard Michael Garbowski, Nutley, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/655,371

(22) Filed: Jan. 18, 2007

(65) Prior Publication Data

US 2008/0174926 A1 Jul. 24, 2008

(51) Int. Cl.
H02H 3/20 (2006.01)

(52) U.S. Cl. ........................................................ 361/90

(58) Field of Classification Search ................... 361/13, 361/88, 90
See application file for complete search history.

(56) References Cited

U.S. PATENT DOCUMENTS

| | | | | |
|---|---|---|---|---|
| 5,614,762 | A * | 3/1997 | Kanamori et al. | 257/69 |
| 5,886,477 | A * | 3/1999 | Honbo et al. | 315/209 PZ |
| 5,903,067 | A * | 5/1999 | Sato et al. | 307/113 |
| 6,643,112 | B1 * | 11/2003 | Carton et al. | 361/152 |
| 6,825,577 | B2 * | 11/2004 | Soto et al. | 307/64 |
| 7,079,363 | B2 * | 7/2006 | Chung | 361/13 |
| 7,133,601 | B2 * | 11/2006 | Phillips et al. | 388/804 |
| 7,282,809 | B2 * | 10/2007 | Melis et al. | 307/9.1 |
| 2005/0116687 | A1 * | 6/2005 | Yokomizo et al. | 320/128 |

OTHER PUBLICATIONS

Paul Horowitz, The Art of Electronics, 2006, The Press Syndicate of the University of Cambridge, Second Edition, 164.*
Donald G. Fink, Standard Handbook for Electrical Engineers, 1968, McGraw-Hill, Inc., Tenth Edition, 10-112-10-123.*
http://www.summitmicro.com/prod_select/summary/pdf/SMH4812.pdf, Dec. 2000.*
Paul Horowitz, The Art of Electronics, 2006, The Press Syndicate of the University of Cambridge, Second Edition, 158-159.*

(Continued)

*Primary Examiner*—Stephen W Jackson
*Assistant Examiner*—Tien Mai
(74) *Attorney, Agent, or Firm*—McCormick, Paulding & Huber LLP (57) ABSTRACT

A DC high power distribution system provides power to a load in parallel with one or more storage capacitors. The system includes a hot-swap controller and an array of parallel-connected transistors connected in series between a DC source and the capacitors/load. A power contactor is connected in parallel to the transistor array, both of which are connected to control outputs of the controller. The controller monitors various circuit conditions of interest, such as input over-voltage, input under-voltage, and over-current. If the circuit conditions meet designated parameters, the controller activates the transistors for charging the capacitors, for limiting inrush current. After charging, the controller activates the power contactor for shunting the transistors and carrying the 150+ ampere current during ongoing operation. If any of the monitored circuit conditions fail to meet designated parameters, the controller halts operation of the circuit by deactivating the power contactor and/or transistors.

18 Claims, 4 Drawing Sheets

OTHER PUBLICATIONS

Paul Horowitz, The Art of Electronics, 2006, The Press Syndicate of the University of Cambridge, Second Edition, 62-63.*
Merriam-Webster's Collegiate Dictionary, 1999, Merriam-Webster, 10th, 64.*
http://www.summitmicro.com/prod_select/summary/pdf/SMH4812.pdf, Dec. 2000.*
Semtech, SC4150, Negative Voltage, Hot Swap Controller, Apr. 14, 2004 www.semtech.com (pp. 1-12).
Dallas Semiconductor, Maxim, Understanding, Using, and Selecting Hot-Swap Controllers, Sep. 22, 2003 http://www.maxim-ic.com/an2736 (pp. 1-4).
Dennis Morgan, LM5067 Evaluation Board, Sep. 2007 The status of this reference as prior art is unknown. www.national.com (pp. 1-12).
Supertex inc. HV100/V101, 3-Pin Hotswap, Inrush Current Limiter Controllers (Negative Supply Rail), 2007 The status of this reference as prior art is unknown. www.supertex.com (pp. 1-8).

* cited by examiner

DC HIGH POWER DISTRIBUTION ASSEMBLY

FIELD OF THE INVENTION

The present invention relates to electrical systems and, more particularly, to DC power supply and regulation systems.

BACKGROUND OF THE INVENTION

Many electronic systems require the provision of DC (direct current) electrical power. Colloquially speaking, DC power involves the flow of electrical current in a constant direction, from a high voltage (i.e., electrical potential) to a low voltage. (In AC—alternating current—power applications, the magnitude and direction of the electrical current vary cyclically.) DC distribution systems are used to provide DC power to electronic circuits and devices that require DC power to operate. As such, DC distribution systems typically perform one or more of the following functions: convert an AC source to a DC waveform; regulate and/or transform the converted DC waveform into a more desired form, e.g., different voltage levels, or a purer DC waveform; and monitor and control the input and/or output power waveforms for safety and/or other control purposes.

High power DC supply systems perform similar functions, but are used in electronics applications requiring large amounts of DC electrical power. For example, in commercial and government wireless telecommunication systems, RF (radio frequency) amplifiers and other high power electronics are used for amplifying voice and data signals for long distance wireless transmission. The amplifiers are housed in a frame or other support assembly, which includes a DC panel board having input and output power lines/buses, supply/filter/bypass capacitors, and banks of circuit breakers. In a typical frame, the electronic devices housed therein might require DC power at the level of hundreds of amperes of current and thousands of watts.

Because of the high voltage and/or current levels involved, high power DC distribution systems require robust, high-capacity components, and in some applications a more robust monitoring and protection scheme. For example, certain applications may require over-voltage safeguards (e.g., protection for situations where an input/source voltage increases significantly), under-voltage safeguards (e.g., protection for situations where an input/source voltage drops or is removed), circuit breaker functionality, and current inrush protection. Regarding the latter, when DC power systems are first activated, high levels of transient current may be generated as a result of capacitor impedance. Large filter and storage capacitors act like a short circuit, producing an immediate inrush surge current with a fast rise time. The peak inrush current may be several orders of magnitude greater than the circuit's steady state current level. This power surge can seriously damage system components, and may result in blown fuses and tripped circuit breakers.

Traditionally, current inrush protection has been provided by way of a large, high-capacity resistor. First, the resistor charges the storage/filter capacitors. Then, the resistor is shorted using a high-current relay. Although such circuits are functional, they are quite bulky, and the resistor may fail if the load is shorted. Moreover, there are no provisions for low and high voltage dropout, e.g., over-voltage and under-voltage safeguards.

SUMMARY OF THE INVENTION

An embodiment of the present invention relates to a DC high power distribution assembly for providing DC power to electronic devices, such as those for use in a telecommunication network or the like. The assembly includes a DC source (e.g., a DC voltage applied across supply and return lines), a storage capacitor system, and a control circuit. A plurality of parallel-connected transistors is connected in series between the DC source and the storage capacitor system. A bypass component is connected in parallel to the transistors. (By "bypass component," it is meant an electrical device or component controllable between an open/off state and a closed/on, low-resistance state.) The transistors and bypass component are connected to separate control outputs of the control circuit. In operation, upon initial start-up of the distribution assembly, the control circuit activates the parallel-connected transistors for charging the storage capacitor system, in a controlled manner for limiting inrush current. Once the capacitors are charged (which typically occurs a short time before the transistors enter a fully on state), the control circuit activates the bypass component for shunting the transistors. "Shunt" is used in its standard electrical sense, by which it is meant a low-resistance connection between two points in an electric circuit that forms an alternative path for a portion of the current. Thus, in this mode, which represents the steady state operational mode of the distribution assembly for supplying DC power to a load, the primary DC current is directed through the bypass component instead of through the transistors, reducing the amount of power consumed by the distribution assembly and eliminating the need for large transistor heat sinks. ("Primary" DC current refers to the electrical current supplied to the load and/or storage capacitor system, which represents the bulk of the current handled by the distribution assembly.)

In another embodiment, the control circuit monitors one or more circuit conditions of the power distribution assembly. ("Circuit condition" refers to a state or value of a circuit or portion thereof while in operation, such as a current level, voltage level, temperature, "on/off" state, or the like.) If any of the monitored circuit conditions fail to meet designated operational parameters (e.g., designated/desired values or ranges of values) prior to initial activation of the transistors for charging the storage capacitor system, neither the transistors nor the bypass component are activated. If any of the monitored circuit conditions fail to meet designated operational parameters after the transistors are activated, operation of the distribution assembly is halted by deactivating the bypass component (to create an open-circuit condition) and/or controlling the transistors to enter or remain in an off state. Examples of monitored circuit conditions include a DC source over-voltage condition (e.g., the control circuit monitors whether the DC source rises above a designated voltage level), a DC source under-voltage condition (e.g., the control circuit monitors whether the DC source falls below a designated voltage level), and an over-current condition (e.g., the control circuit monitors whether the primary DC current rises above a designated level). The over-current condition may be monitored by measuring the voltage across a high capacity resistor connected in series with the transistors and bypass component. (By "high capacity," it is meant a resistor capable of handling the primary DC current of the power distribution assembly during steady state operation.)

In another embodiment, the distribution assembly is a high power distribution assembly rated for providing at least about 150 amperes of primary DC current during steady state operation. For handling such current loads, the bypass component may be a power contactor or other heavy-duty relay-like device. Additionally, the DC source, transistors, and/or bypass component may be connected using metal bus bars rated for carrying current loads of this amount. The storage capacitor system will typically include one or more capacitors having a total electrical storage capacity of at least about 100,000 µF.

In another embodiment, the control circuit includes an IC (integrated circuit) controller portion and one or more external sense components for use in monitoring the circuit conditions of interest. The controller includes various monitoring inputs and various control outputs, two of which are connected to the transistors and bypass component. The controller may be an existing, commercially available controller intended for use in other contexts, such as a hot-swap controller. (Hot-swap controllers prevent damage and operational faults in low-current applications where line cards or other circuit boards are inserted into an electrically live backplane, typically by controlling a single FET or other transistor to limit inrush current when the line card is first inserted. The FET then carries the primary current drawn by the line card(s) during ongoing operation.)

In another embodiment, the parallel-connected transistors (typically there will be from 6 to 12 parallel-connected transistors) are arranged and configured in a highly symmetrical array, including possible provision of high-impedance gate resistors, to compensate for transistor time delays and for current canceling in the transistors. This facilitates control of the multiple transistors by the controller, for placing the transistors in a linear operational state for a short time period for charging the storage capacitor system. Inrush current is thereby limited even at high current and power levels, e.g., 150 amperes at 8000 watts, without having to use a resistor and large-sized heat sink.

In another embodiment, an IC-based hot-swap controller is used in conjunction with (i) an array of parallel-connected transistors for controlling inrush current when charging the storage capacitor system, (ii) high capacity (where applicable) and other sense components for monitoring over-voltage, under-voltage, and over-current conditions, and (iii) a bypass component for bypassing the transistors during steady state operation. In such a configuration, the power assembly is low cost, compact in size (e.g., no large heat sinks), allows for re-use, and provides both current inrush protection and advanced monitoring functions at very high current and power levels.

In another embodiment, a DC high power distribution system provides power to a load that is connected in parallel with one or more storage capacitors. The system includes a hot-swap controller and an array of parallel-connected transistors connected in series between a DC source and the capacitors and load. A power contactor is connected in parallel to the transistor array, both of which are connected to separate control outputs of the controller. The controller monitors various circuit conditions of interest, such as input over-voltage, input under-voltage, and over-current. If the circuit conditions meet designated parameters upon initial start-up, the controller activates the transistors for charging the capacitors, for limiting inrush current. After charging, the controller activates the power contactor for shunting the transistors and carrying the 150+ ampere current during ongoing operation. If any of the monitored circuit conditions fail to meet designated parameters during ongoing operation, the controller halts operation of the circuit by deactivating the contactor and/or transistors.

BRIEF DESCRIPTION OF THE DRAWINGS

The present invention will be better understood from reading the following description of non-limiting embodiments, with reference to the attached drawings, wherein below.

DETAILED DESCRIPTION

With reference to FIGS. 1-6, the present invention relates to a DC high power distribution assembly or system 10, and to a method of controlling and/or providing DC power through such a system. As shown in overview in FIG. 1, the system 10 includes a DC source 12 (e.g., a voltage potential supplied across supply and return lines 14a, 14b), a storage capacitor system 16, and a monitoring and control circuit/system 18. The control system 18 may include a controller 20, such as an IC (integrated circuit) hot-swap controller, and one or more external monitoring and control components 22 operably electrically connected to the controller 20. An array 24 of parallel-connected transistors 26 is connected in series between the DC source 12 and the storage capacitor system 16. A bypass component 28 is connected in parallel to the transistor array 24. The transistor array 24 and bypass component 28 are connected to separate control outputs of the control system 18. Also connected in series with the DC source 12 and transistor array 24 are a load 30 and circuit breaker(s) 32. The load 30, for example, may include one or more electrical devices requiring DC power for operation, such as RF amplifiers housed in a support frame.

Figure 1:
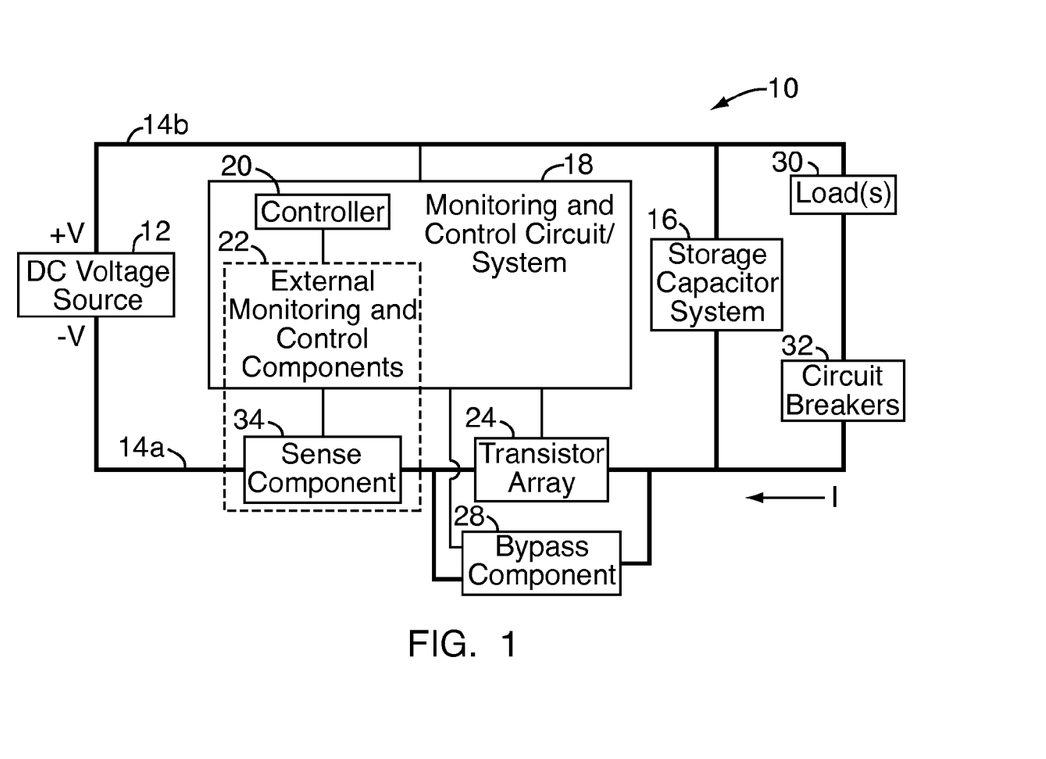
FIG. 1 is a schematic diagram of a DC high power distribution assembly/system according to an embodiment of the present invention.

In operation, upon initial start-up, the control system 18 activates the parallel-connected transistors 26 for charging the storage capacitor system 16, in a controlled manner for limiting inrush current. In particular, the transistors 26 are controlled from an "off" state to an "on" state, in between which the transistors operate in a linear region of operation. In the linear region of operation, the transistors function as variable resistors, limiting inrush current. The transistors remain in the linear region of operation for a short time period (e.g., typically less than 80-100 msec) sufficient to charge the storage capacitor system 16. After this time period, the control system 18 activates the bypass component 28 for shunting the transistors. In this mode, which represents the steady state operational mode of the system 10 for supplying DC power to the load 30, the primary DC current "I" is directed through the bypass component 28 instead of through the transistors 26, reducing the amount of power consumed by the system 10.

On an ongoing basis, the control system 18 monitors one or more circuit conditions of the power distribution system 10. As noted above, "circuit condition" refers to a state or value of a circuit or portion thereof while in operation, such as a current level, voltage level, temperature, "on/off" state, or the like. If any of the monitored circuit conditions fail to meet designated operational parameters (e.g., designated/desired values or ranges of values) prior to initial activation of the transistor array 24 for charging the storage capacitor system 16, neither the transistors 26 nor the bypass component 28 are activated. In this manner, the system 10 remains in an "off" or standby mode, without power being supplied to the load 30, until the circuit conditions meet the designated operational parameters. (It may also be necessary to manually reset the control system 18, or perform similar operations.) If any of the monitored circuit conditions fail to meet designated operational parameters after the transistors 26 are activated, the control system 18 halts operation of the distribution system 10 by deactivating the bypass component 28 (to create an open-circuit condition) and/or by controlling the transistors 26 to enter or remain in an off state. Examples of monitored circuit conditions include a DC source over-voltage condition (e.g., the control system 18 monitors whether the DC source rises above a designated voltage level), a DC source under-voltage condition (e.g., the control system 18 monitors whether the DC source falls below a designated voltage level), and an over-current condition (e.g., the control system 18 monitors whether the primary DC current I rises above a designated level). Over-current conditions may be monitored by interposing a sense component 34 in the pathway of the primary current I, such as a high capacity resistor 36 connected in series with the transistor array 24 and bypass component 28.

An embodiment of the system 10 will now be described in more detail with respect to FIGS. 2-6.

Figure 2:
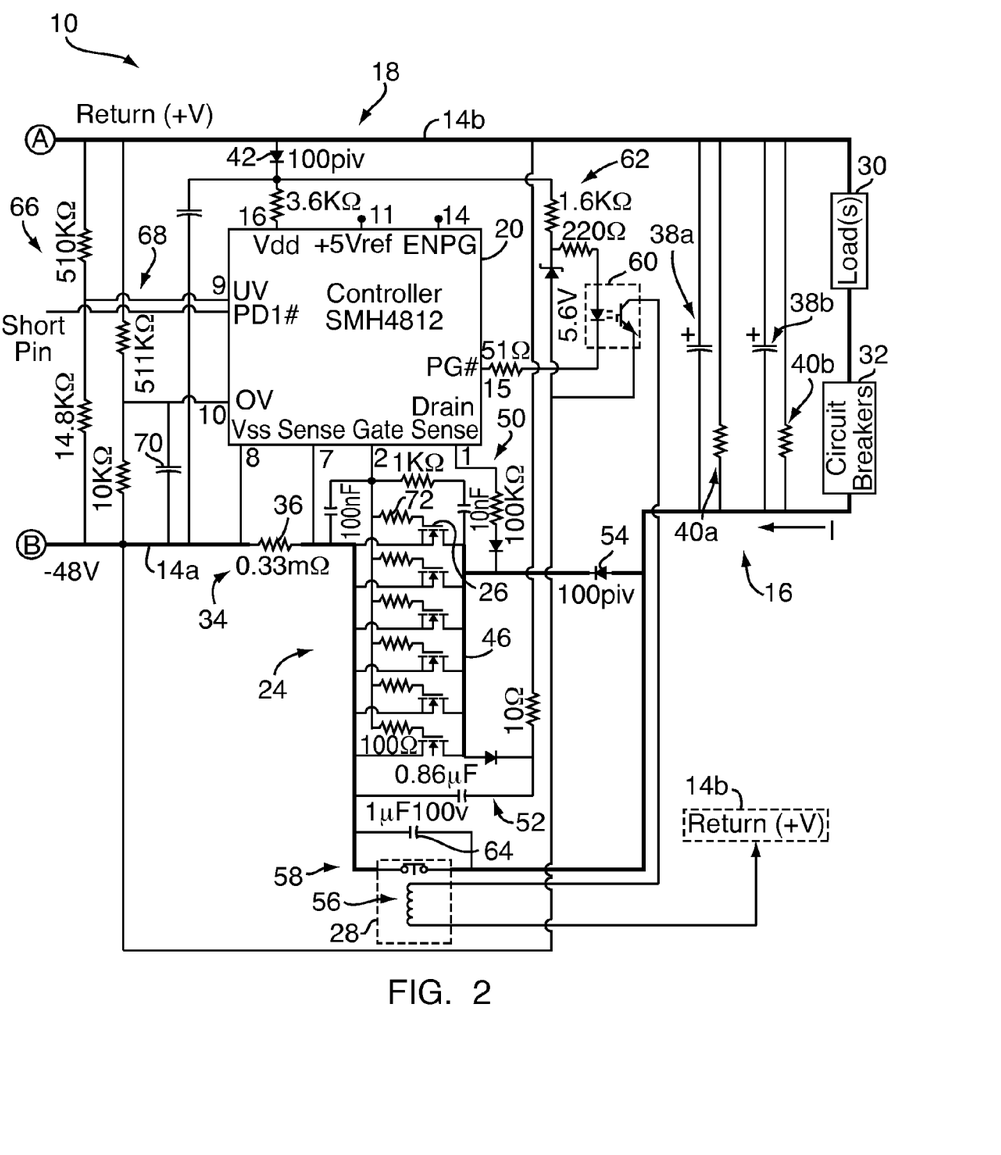
FIG. 2 is a schematic diagram of another embodiment of the distribution system.

As discussed above, the system 10 is particularly applicable for use in contexts where high levels of DC power are required for operating electronic devices such as network line cards and RF amplifiers. Many telecommunication devices are configured to operate at a standard −48V, as shown as being provided on the primary line 14a in the figures. At this voltage level, for the main supply line/bus 14a, the primary, steady state current capacity (e.g., primary current I) may need to be as high as 200 amperes, sometimes more. A typical capacity rating is 150 amperes. For handling such high current levels, the supply and return lines 14a, 14b (including interconnects between components along the path of the primary DC current) may be heavy-gauge metal bus bars (e.g., copper bus bars) rated for carrying current loads at or above the current capacity of the system 10. Other types of heavy gauge lines or cables may also be used, depending on the application. In either case, the heavy-gauge, high current pathways are represented as bold lines in the drawings. The DC source 12 is a standard high capacity DC source, such as a DC generator, a battery system, or a DC power supply (e.g., a rectifier and/or transformer based circuit) connected to an AC transmission line or other AC source. The storage capacitor system 16 includes one or more bulk storage capacitors 38a, 38b connected across the primary and return lines 14a, 14b, and bleeder resistors 40a, 40b connected in parallel to each capacitor to meet UL® safety rules. The storage capacitors 38a, 38b help to regulate the overall current draw of the system, by acting as a rapid source of electrical power when the power requirements of the aggregate load 30 increase. For high power applications, the storage capacitor system 16 will typically have a total electrical storage capacity of about 100,000 μF or greater.

Figure 6:
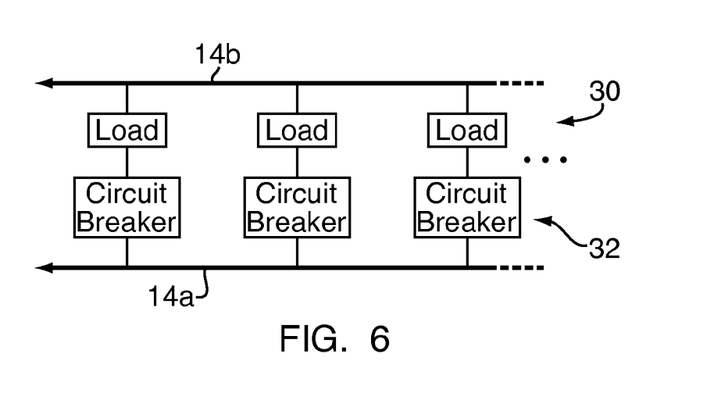
FIG. 6 is a schematic diagram of a typical load portion of the system.

The primary current I, supplied through the main supply line 14a, is distributed as various branch currents that flow through the circuit breakers 32, which have a somewhat lower current capacity. (For example, the circuit breakers 32 may be plug-in style circuit breakers, typically in the range of 1-100 amperes capacity depending on the load.) Although the circuit breakers and loads are shown grouped together in FIGS. 1 and 2, in actuality it is usually the case that each circuit breaker is separately connected in series with a designated load device, with the respective load/circuit breaker pairs being connected in parallel across the supply and return lines, as shown in FIG. 6. Within the constraints provided by the system 10, the actual primary current I flowing at any particular time will depend on the power drawn by the load devices 30.

The monitoring and control system 18 functions to monitor various circuit conditions, to control the transistor array 24 to charge the capacitor system, and to control the bypass component 28 for subsequently shunting the transistors, if the circuit conditions meet designated operational parameters that correspond to a desired operational state of the system 10. The control system 18 also functions as an electronic circuit breaker, by shutting down the system 10 if the circuit conditions fail to meet the designated parameters during ongoing monitoring. The control system 18 includes the IC-based controller 20 and one or more external control components 22. The controller 20 may be a standard hot-swap controller of the type intended for low power hot-swap applications.

To elaborate, hot-swap controllers prevent damage and operational faults in low power applications (e.g., several amperes at 48V) where installation of a line card or other circuit board or electrical device requires attachment to a live power source, e.g., a line card that is inserted into a live backplane. When the device is attached to the power source, the discharged power supply filter capacitors present a low impedance, which is met with an inrush current spike. The current spike can cause power supply failure or other circuit damage. Hot-swap controllers reside either in the power backplane or in the device, and provide inrush current limiting when the device is first attached to a live power source. They may also provide short-circuit protection while the device is in operation. In most cases, hot-swap controllers limit the inrush current by slowly decreasing the on-resistance of a single N-channel MOSFET. When the device is first plugged in, the controller slowly enhances the MOSFET, allowing the voltage at the MOSFET's drain terminal to rise from zero volts, or to fall from zero volts for devices powered by a negative supply. For this purpose, the controller senses the current across a sense resistor (e.g., a low power surface mount resistor) and controls the MOSFET's gate accordingly.

Although hot-swap controllers were not originally intended for use in high power circuits, the system 10 is configured in a manner that permits such use in a safe and efficacious manner, e.g., through utilization of a high capacity sense resistor 34 and a symmetrical multi-transistor array 24. Furthermore, considering that running the primary current through a transistor array in steady state operation would result in increased power consumption and would require a very large-sized transistor array and heat sink, efficient operation of the system 10 in a low-cost and small-size package is further facilitated through use of the bypass component 28. As further explained below, the bypass component is controlled through an existing control function of the controller, which is used in conventional applications for enabling an external DC/DC converter or other external device.

Suitable hot-swap controllers for use as the controller 20 include the Analog Devices™ ADM1070 model and the Summit Microelectronics™ SMH4812 and SMH4802 models, among others. As an example, the design and operation of the power distribution system 10 will be further explained herein with respect to a Summit Microelectronics™ SMH4812 hot-swap controller. However, the system 10 may be easily adapted for using any type of hot-swap controller, provided the controller has typical control and monitoring functions as described herein.

Referring back to FIG. 2, the controller 20 is a standard-packaged integrated circuit that includes a number of input and output pins or terminals. For example, the SMH4812 hot-swap controller has 16 pins, which are numbered as shown in FIG. 2 (only some of the pins are used). For powering the controller 20, a positive power supply pin "Vdd" of the controller 20 is connected to the return line 14b through a resistor and diode 42. The diode 42 protects the controller 20 against the possibility of a reverse polarity input voltage. The negative power supply pin "Vss" of the controller 20 is connected to the supply line 14a.

Figure 5A:
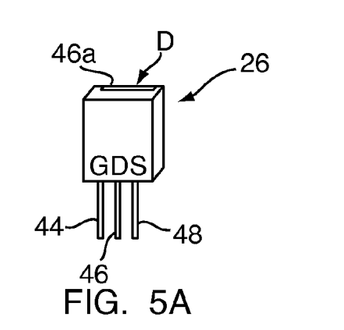
FIG. 5A is a perspective view of a standard discreet transistor.

The controller 20 also includes a "gate" output pin for controlling the transistor array 24. The gate pin provides an output voltage that is applied to the gate terminals 44 of the transistors 26 for controlling the transistors between an "off" state, a linear region state, and an "on" state. As shown in FIG. 5A, each transistor 26 is a solid state, 3-terminal device having a gate connector ("G") 44, a drain connector ("D") 46, and a source connector ("S") 48. Although this is an overly simplified explanation, a transistor of this type can be thought of as comprising a variable resistor disposed between the drain 46 and source 48, wherein the value of the resistance depends on the voltage applied to the gate terminal 44. In the off state, the resistance is extremely high, e.g., in effect an open circuit. In the on state, the resistance is low. In the linear region, the resistance varies between the low and high extremes. Typically, each transistor 26 is a discreetly packaged FET (field effect transistor), such as a power MOSFET. A suitable example is the IRFPS3810 power HEXFET™ from International Rectifier™, which is rated for carrying 170 amperes of current. The transistor array 24 includes from 6 to 12 transistors (6 is sufficient for many applications), which are connected in parallel, meaning commonly connected gate terminals, commonly connected source terminals, and commonly connected drain terminals. The transistor array 24 replaces the single transistor usually controlled by the controller 20. Inrush current is limited by operating the transistors 26 in the linear region for a short time period. With a limited inrush current of, e.g., 150 amperes, the transient power handled by the transistors can reach 8000 watts.

The commonly connected drain terminals 46 of the transistors 26 are connected to a "drain sense" pin of the controller 20 through a resistor and diode 50. By way of the drain sense pin, the controller 20 monitors the voltage at the drain terminals with respect to the Vss value (e.g., the voltage present on the supply line 14a, such as −48V). Unless the drain sense is held below a 2.5V difference, the "PG#" ("power good") pin of the controller, which is used to activate the bypass component (as discussed below), is non-enabled. Monitoring at the drain sense pin allows the controller to determine if any of the transistors 26 have failed.

A snubber circuit 52 may be connected between the transistor array 24 and the return line 14b to limit voltage overshoot with inductive loads. The snubber circuit includes a capacitor, a diode, and a resistor, which are arranged as shown in FIG. 2. A diode 54 is connected in series with the transistor array 24 and storage capacitor system 16, for preventing current from the storage capacitors 38a, 38b from entering the low voltage supply line.

The drain terminals 46 are further connected to the controller's gate pin via a capacitor and a resistor, e.g., at 10 nF and 1 kohm values, respectively. The controller's gate and sense pins are interconnected via a 100 nF capacitor. These components provide feedback for operation of the controller 20, and are particular to the SMH4812. Other hot-swap controllers, or other controllers generally, may utilize different feedback components, or no feedback components of this type, pursuant to manufacturer's instructions.

The sense resistor 36 is connected across the Vss and sense pins of the controller 20, and is also connected in series with the transistor array 24. The sense pin is a circuit breaker sense input used by the controller 20 for detecting over-current conditions across the sense resistor 36, which carries the primary DC current I. A voltage drop of more than 50 mV across the resistor 36 for more than a designated time period will trip the controller's circuit breaker function, e.g., for deactivating the transistors 24 and/or the bypass component 28. For high power applications, the sense resistor 36 may be a meter shunt. Meter shunts are high current, low impedance resistors, sometimes provided in a form resembling a metal bar (or bars) with end terminals, used in electrical utility meters (or other DC measurement devices) as part of the process of measuring electrical usage. More specifically, the shunt is a specially designed, temperature-stable resistor that delivers a millivolt output (to a millivolt meter or instrument) in proportion to the current flowing through the resistor. (The purpose of this function is to shunt/bypass the large current load away from the measurement instrument, while still providing an electrical signal representative of the quantity to be measured.) Typical meter shunts are standardized to operate at either a 50 mV or a 100 mV voltage drop at their full rated current load, which can range from 0.5 to 15,000 amps. Suitable meter shunts for the system 10 include the A150A50 shunt (50 mV at 150 A) and the AL200A50 shunt (50 mV at 200 A) available from Ram Meter, Inc. (References are to catalog numbers.) Replacing a hot-swap controller's typical surface mounted and/or low power sense resistor with a meter shunt or other large shunt resistor facilitates use of the hot-swap controller in large-current contexts.

The bypass component 28, as noted above, is an electrical device or component controllable between an open/off state and a closed/on, low-resistance state. For high power applications, it is usually most efficient to use an electro-mechanical bypass component, which refers to an electrically controlled mechanical switch operable between an open circuit state and a closed, negligible resistance state. Relays are one example of an electro-mechanical bypass component. A power contactor may be used if the system 10 is intended for handling high power levels. Power contactors are heavy-duty relay-like devices typically used in the electric vehicle and electric power industries. The power contactor 28 is a four terminal device that includes a coil portion 56 and a switch portion 58, which are housed together in a compact package. The switch portion 58 is normally open. The coil and switch are operably positioned so that when the coil is activated (e.g., by applying a designated voltage across the coil), the coil 56 emits an electro-magnetic field that closes the switch 58. The coil thereby acts as a low voltage control element for controlling the switch, which is rated to carry a particular current load. Suitable power contactors 28 include the Ametek Prestolite™ JB 46 series DC contactors, which are rated from 150-200+ amperes.

The switch portion 58 of the power contactor 28 (or other bypass component) is connected in parallel to the transistor array 24, by way of heavy gauge metal bus bars. When the switch 58 is open, the primary current path is through the transistor array 24. When the switch 58 is closed, the primary current path is through the switch. Because the switch is connected in parallel to the transistors, closing the switch shunts the transistors, deactivating the transistors and causing the primary current I to be routed through the switch. (When the switch is closed, it presents a very low resistance and effectively no voltage drop. Since the voltage is effectively the same at both the drain and source terminals of the transistors, the transistors are deactivated and in a high-resistance state. The vast bulk of the current takes the path of least resistance through the closed switch.) Shunting the primary current I through the power contactor eliminates the need for a large heat sink for the transistors, since they carry current only on a transient basis. The coil portion 56 of the power contactor 28 is connected between the return line 14b (positive voltage) and the output of an opto-isolator 60. The input of the opto-isolator 60 is connected to the PG# pin of the controller 20. The opto-isolator 60 isolates the coil 56 from the controller PG# pin, which has a 12V withstand capability, thereby allowing the controller 20 to control the power contactor 28. The opto-isolator 60 is biased for operation using circuit 62, which includes various resistors and a zener diode. (This circuit 62 also serves to regulate current.) The PG# output of the controller 20 is an "active low" output. Thus, when the PG# pin is non-enabled, it is in a high impedance state. The opto-isolator 60 remains turned off, and there is no voltage across the power contactor coil 56. When the PG# pin is enabled, its output drops to a low voltage, which activates the opto-isolator for applying the supply line voltage (−48V) to one terminal of the coil. Since the other coil terminal is connected to the return line 14b, the voltage difference across the coil terminals activates the coil 56 for closing the switch 58. An arc suppression capacitor 64 may be connected in parallel to the terminals of the switch portion 58 for eliminating arcing when the DC power contactor 28 opens under load.

The hot-swap controller 20 also includes "UV" (under voltage) and "OV" (over voltage) monitoring inputs. The UV and OV inputs provide a set of comparators that act in conjunction with external resistive divider ladders 66, 68 to sense when the DC voltage source 12 exceeds user defined limits, e.g., if the voltage present across the supply lines 14a, 14b increases above a desired level or falls below a desired level. If an over-voltage or under-voltage condition is detected at the OV or UV input pins, respectively, the gate terminal is disabled for deactivating the transistor array 24. The power contactor 28 is also deactivated. Instead of using two resistor ladders, as shown in FIG. 2, a single resistor ladder may be used instead. A capacitor 70 may be disposed between the OV input and the supply line 14a for noise suppression on the OV input.

In operation, upon the initial application of a voltage across the supply and return lines 14a, 14b, e.g., as supplied by the DC supply 12, the controller 20 enters a "power on" or start-up state. Initially, both the gate output pin and the PG# output pin of the controller 20 remain disabled, meaning that the transistor array 24 and power contactor 28 are deactivated. In this initial state, no power is supplied to the capacitor system 16 or load 30. After a very short delay to allow for contact bounce and internal regulator stabilization, the controller 20 determines whether the DC source voltage across the lines 14a, 14b is within a user-specified range, by way of internal under-voltage and over-voltage circuits connected to the UV and OV input pins, respectively. (The user-specified range might be, for example, −48V±1V.) If the source voltage is within the designated range during a designated delay period, the gate output of the controller 20 is enabled for activating the transistor array. Subsequent to the gate output being enabled, the transistors 26 transition from an "off" state to an "on" state, between which is a linear region of operation where the transistors act as variable resistors for limiting inrush current. The inrush period is typically limited to around 80 msec at the rated system current (e.g., 150 amperes), for the circuit shown in FIG. 2, which is sufficient to charge the capacitor system 16. (The length of the inrush period may vary depending on the particular circuit configuration.) Because transistors typically transition from "off" to "on" in less than 80 msec, the transistors 26 are outfitted with gate resistors 72. For each transistor 26, one of the gate resistors 72 is connected in series between the transistor's gate terminal and the gate output of the controller. The gate resistors have the effect of changing the RC time constant of the circuit, resulting in a longer transition time for the transistors to turn on upon enablement of the controller gate output. A suitable gate resistor value for the circuit shown in FIG. 2 is 100 ohms. (The controller gate output is current limited to a set value, allowing the use of such passive components for changing the transistor slew rate.)

During the controlled inrush period, the controller 20 monitors the voltage across the transistor array 24 (e.g., $V_{DS}$), by way of the "drain sense" input. When the monitored voltage falls to a low value (typically <2.5V with respect to $V_{SS}$), and if the voltage on the controller gate output has reached $V_{DD}$-$V_{GT}$ (the threshold voltage of the transistors 26), this indicates that the transistors are turned on. The controller 20 enables the active-low PG# output, which is normally used for starting a DC/DC converter. Here, however, enablement of the PG# output results in activation of the power contactor 28 through the opto-isolator 60. The power contactor 28 shunts the primary current I around the transistor array 24 and diode 54. The power contactor 28 carries the primary current I during steady state operation of the system 10 for supplying power to the load 30, reducing the power consumed by the system 10 and eliminating the need for outfitting the transistor array 24 with a large heat sink. (The heat sink would normally be required for dissipating waste heat produced by the transistors and diode 54 in carrying the primary current I for an extended period of time.)

On an ongoing basis, and concurrently with enabling the gate output, the controller 20 monitors the voltage across the sense resistor 36 by way of the "sense" input. A voltage drop of more than 50 mV across the sense resistor for longer than a designated programmable time period will activate the controller's electronic circuit breaker function. The circuit breaker function is also tripped if an over-voltage or under-voltage condition is detected, as discussed above, or if a transistor failure is detected by way of the "drain sense" input. For the circuit breaker function, the controller gate output is disabled, turning off the transistor array 24. Disablement of the gate output results in disablement of the PG# output for deactivating the power contactor 28. Typically, the controller may be configured for either latching into an "off" state when the circuit breaker function is activated (requiring that the controller be manually reset), or for re-entering the power-on cycle when the monitored circuit conditions return to meeting the designated parameters.

Figure 3:
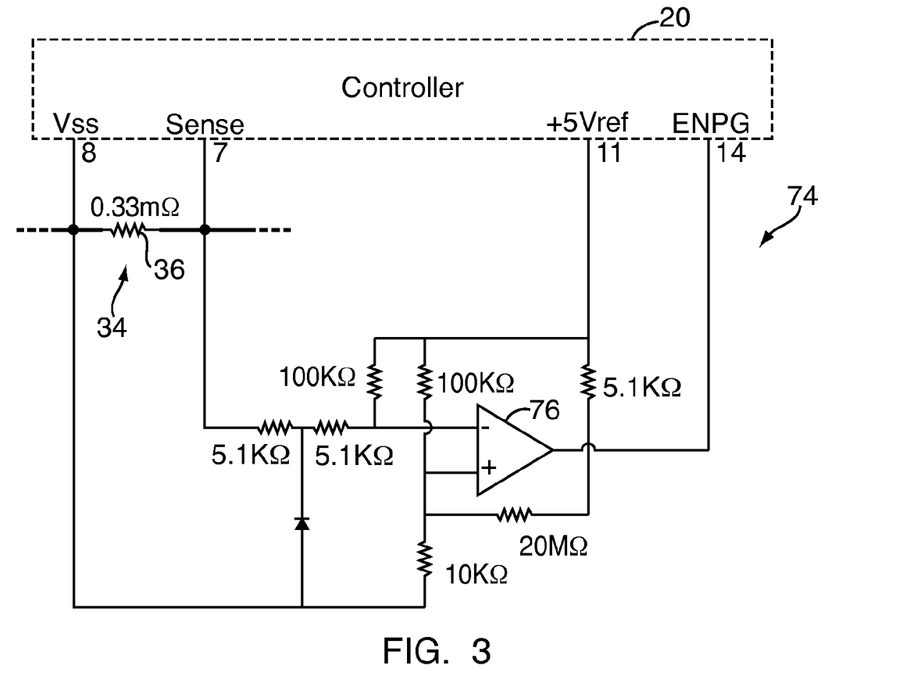
FIG. 3 is a schematic diagram of a current direction detection circuit, for optional use as part of the power distribution system.
Figure 4:
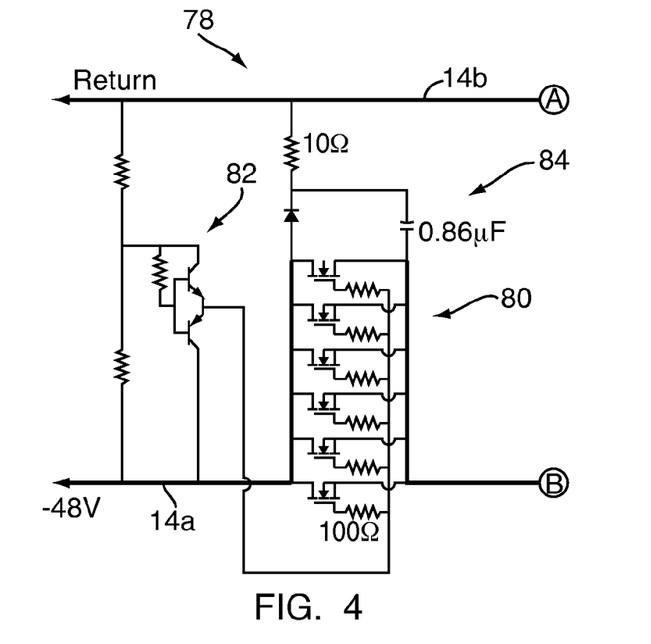
FIG. 4 is a schematic diagram of a reverse polarity protection circuit.

Under certain industry standards, it may be requirement for the system 20 to ride through an input under-voltage transient of 10 msec, e.g., for fuse clearing. For this purpose, the system 10 may be outfitted with a comparator circuit 74 for monitoring the direction of the current flowing through the sense resistor 36, as shown in FIG. 3. (The comparator circuit 74 also serves to augment the controller's primary under-voltage detection mechanism.) The comparator circuit 74 has inputs connected in parallel to the sense resistor 36, and an output connected to an "ENPG" input of the controller 20. The comparator circuit 74 includes an operational amplifier 76 and an external biasing/configuration circuit including various resistors and a diode arranged as shown. (The "+5 Vref" output of the controller is simply a +5V reference voltage.) When a reverse current is detected by the comparator circuit 74 (due to a loss of input voltage), it pulls the ENPG input of the controller 20 to a low voltage. The ENPG input controls the PG# output. When ENPG is pulled low the PG# output is immediately placed in a high impedance state, i.e., it is disabled, which results in deactivation of the transistor array 24 and power contactor 28. The diode 54 prevents current from the capacitor system 16 from entering the input line, enabling the capacitors to deliver their full output to the load 30. When the input voltage returns to within its designated operational range, the controller startup sequence is initiated.

It may also be a requirement to protect the system 10 against a reverse polarity input voltage, e.g., the −48V source voltage being connected to the return line 14b as opposed to the supply line 14a. For reverse polarity protection, the power input of the controller 20 may be outfitted with a diode 42, as noted above. The voltage source may also be provided with diode protection, such as a reverse polarity protection circuit 78 shown in FIG. 4. Circuit 78 is connected to the circuit in FIG. 2 as indicated by points "A" and "B." The circuit 78 includes a transistor array 80 (which provides a low voltage drop), a gate control circuit 82, and a snubber circuit 84. If the input voltage is reversed during initial wiring, the transistor array 80, acting like a diode, prevents damage by not turning on.

The controller 20 also includes a "PD1#" input for pin detection purposes. The PD1# input is an active low-enabled input generally used to indicate that a plug-in circuit board is properly seated. In the system 10, the PD1# pin may be connected to a short pin in the input connector, e.g., a connector for connecting the system 10 to the DC source 12. No action can occur until the high current pins of the connector are mated, eliminating arcing. The PD1# pin may be used in other manners depending on the exact configuration of the system 10.

Figure 5B:
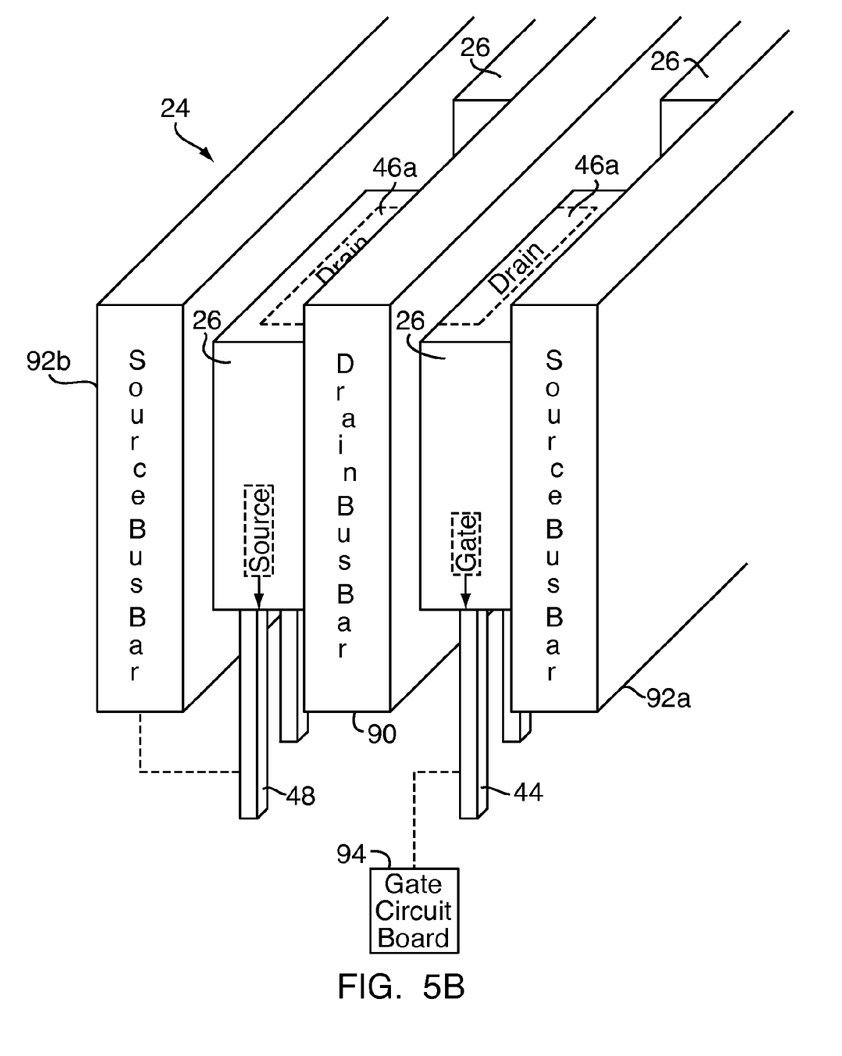
FIG. 5B shows a transistor array according to an embodiment of the present invention, partially in perspective and partially in schematic form (not in scale)

To facilitate the use of relatively small-sized transistors for high power switching at the levels discussed above, the parallel-connected transistors 26 are arranged and configured in a highly symmetrical array 24. An example of one possible mechanical arrangement for the array is shown in FIG. 5B. The configuration of this array is based in part on the use of transistors 26 such as those shown in FIG. 5A. As shown, each transistor not only includes a depending leg for each terminal 44, 46, 48, but in addition a drain connection 46a on the back plane of the transistor package. (This terminal is electrically connected to the depending drain pin; both are electrically connected to the actual drain terminal of the semiconductor transistor element housed in the transistor package.) The array 24 includes a drain bus bar 90 formed of a heavy gauge metal, such as a copper bus bar. The transistors 26 are mechanically connected back-to-back against the drain bus bar 90, such that the back plane drain connectors 46a are in electrical connection with the drain bus bar 90. The drain bus bar 90 is electrically connected to the diode 54. The transistors 26 and drain bus bar 90 are sandwiched between first and second source bus bars 92a, 92b (e.g., copper bus bars), which are in turn electrically connected to one another. The depending source connectors 48 of the transistors, which stick out from between the bus bars, are electrically connected to their respective neighboring source bus bars 92a, 92b, as illustrated schematically in FIG. 5B. The source bus bars 92a, 92b are electrically connected to the sense resistor 36. The gate connectors 44 of the transistors are electrically connected to a gate circuit board 94, which includes the gate resistors 76 and conductive traces for (i) connecting the gate connectors 44 to respective resistors 76 and (ii) for connecting the common connection point of the resistors to the controller gate output. (The gate circuit board may also hold the snubber circuit 52, the external components connected to the controller drain sense input, etc.)

In the present specification, "about" refers to ±1 of the least significant digit of the value in question. Thus, "about 150 amperes," for example, means 150±1 amperes.

Further information regarding the Summit Microelectronics™ SMH4812 hot-swap controller may be found in its data sheet, available on the Internet at http://www.summitmicro.com/prod_select/summary/pdf/SMH4812.pdf, which is hereby incorporated by reference herein in its entirety.

Depending on the particular components used in the system 10, e.g., the particular type of controller 20, the system 10 may include components other than those shown in the drawings, and/or components in addition thereto. Such components can be selected according to the specifications of the controller in question, using standard circuit design practices. The component values mentioned herein and in the drawings are provided as examples only.

Since certain charges may be made in the above-described DC high power distribution assembly, without departing from the spirit and scope of the invention herein involved, it is intended that all of the subject matter of the above description or shown in the accompanying drawings shall be interpreted merely as examples illustrating the inventive concept herein and shall not be construed as limited the invention.

We claim:

1. A high current DC power distribution system rated for providing at least about 150 amperes of primary electrical current during steady state operation, the system comprising:
    a plurality of parallel-connected transistors connected in series between a DC source and a storage capacitor system in parallel with a high current load; and
    a control circuit operably connected to the transistors and to a bypass component connected in parallel to said transistors, wherein the control circuit is configured to activate the transistors in linear mode for controllably charging the storage capacitor system, and, subsequently, to activate the bypass component via an opto-isolator for shunting the transistors for steady state operation of the system,
    wherein the plurality of parallel-connected transistors is arranged in a symmetric array, back-to-back against a first common bus bar, said first common bus bar being electrically connected to a first type of operational terminal of the transistors, and said array being disposed between second and third bus bars commonly electrically connected to a second type of operational terminal of the transistors, said bus bars being connected in series between the DC source and the storage capacitor system, and a third type of operational terminal of each of the transistors being electrically connected to the control circuit for controlling activation of the transistors.

2. The system of claim 1 wherein the control circuit is configured to deactivate the transistors and/or bypass component, for deactivation of the power distribution system, upon one or more of a plurality of monitored circuit conditions of the distribution system failing to meet respective designated operational parameters.

3. The system of claim 1 wherein:
the storage capacitor system comprises one or more capacitors having a total electrical storage capacity of at least about 100,000 µF;
the bypass component comprises a power contactor having a switch portion and a control portion for selective actuation of the switch, said switch portion being connected in parallel to the transistors and said control portion being connected to the control circuit; and
the DC source, the transistors, and the switch portion of the bypass component are electrically interconnected by metal bus bars rated for carrying at least about 150 amperes of DC current during steady state operation of the system.

4. The system of claim 1 wherein:
the control circuit comprises an integrated circuit controller portion and at least one external sense component connected to the controller portion for monitoring said circuit conditions, said controller portion having a first output for controlling a gate voltage of the transistors and a second output for controlling the bypass component.

5. The system of claim 4 wherein:
the monitored circuit conditions include an over-current condition; and
the at least one sense component comprises a high capacity resistor connected in series with the transistors and bypass component, said high capacity resistor carrying the primary DC current during operation of the distribution system, and said high capacity resistor being further connected in parallel to two over-current monitoring inputs of the controller.

6. The system of claim 5 wherein:
the monitored circuit conditions further include a primary current direction condition; and
the at least one sense component further comprises a current direction detection circuit connected in parallel with the high capacity resistor, said current direction detection circuit having an output connected to an input of the controller for triggering deactivation of the transistors and/or the bypass component.

7. The system of claim 4 wherein:
the monitored circuit conditions include a DC source over-voltage condition and a DC source under-voltage condition; and
the at least one sense component comprises at least one voltage divider for monitoring the over-voltage condition and the under-voltage condition, said at least one voltage divider comprising a plurality of resistors connected between supply and return line portions of the DC source and further connected to over and under-voltage monitoring inputs of the controller.

8. The system of claim 1 further comprising:
a reverse polarity circuit operably connected to at least one of the DC source, the control circuit, and the storage capacitor system, wherein the power distribution system normally supplies power to the high current load from the DC source, and wherein the reverse polarity circuit is configured for continued activation of the bypass component to supply power from the storage capacitor system to the high current load when the DC source is connected but provides a voltage lower than the voltage of the storage capacitor system.

9. The system of claim 2 wherein:
the bypass component is in an open condition during activation of the transistors for controllably charging the capacitor system; and
the control circuit is configured to activate the bypass component once the transistors are in a fully on operational condition.

10. A method of controlling a DC power distribution assembly rated for providing at least about 150 amperes of primary electrical current during steady state operation and having a DC source and a storage capacitor system, said method comprising the steps of:
controlling a plurality of parallel-connected transistors to charge the storage capacitor system from the DC source; and
subsequent to charging the storage capacitor system, controlling a bypass component to shunt the transistors for steady-state operation of the assembly wherein the bypass component is activated via an opto-isolator.

11. The method of claim 10 further comprising:
monitoring at least one circuit condition of the DC power distribution assembly, wherein the transistors are controlled to charge the storage capacitor system only if the at least one monitored circuit condition meets a designated operational parameter.

12. The method of claim 11 further comprising:
monitoring the at least one circuit condition on an ongoing basis; and
deactivating the transistors and/or bypass component, to halt operation of the power distribution assembly, if the at least one circuit condition fails to meet the designated operational parameter.

13. The method of claim 10 further comprising:
monitoring at least one circuit condition of the DC power distribution assembly; and
deactivating the transistors and/or bypass component, to halt operation of the power distribution assembly, if the at least one circuit condition fails to meet a designated operational parameter.

14. The method of claim 13 wherein:
the monitored circuit condition is an over-current condition, said over-current condition being monitored through a high capacity resistor connected in series with the transistors and bypass component, said high capacity resistor carrying the primary electrical current during operation of the distribution assembly.

15. The method of claim 13 wherein:
the at least one monitored circuit condition comprises a DC source over-voltage condition and a DC source under-voltage condition, wherein the over and under-voltage conditions are monitored through at least one voltage divider connected between supply and return line portions of the DC source.

16. The method of claim 10 wherein:
the bypass component carries the primary electrical current when the bypass component is activated for shunting the transistors.

17. A method of providing at least about 150 amperes of steady state DC power comprising the steps of:
determining if at least one monitored circuit condition of a DC power distribution assembly meets one or more designated operational parameters;
if so, controlling a plurality of parallel-connected transistors to charge a storage capacitor system with about 150 amperes of primary electrical current from a DC source; and
subsequent to charging the storage capacitor system, controlling a bypass component to shunt the transistors for steady-state operation of the distribution assembly wherein the bypass component is activated via an opto-isolator.

18. The method of claim 17 wherein:
the method further comprises deactivating the transistors and/or bypass component, to halt operation of the power distribution assembly, if the at least one circuit condition fails to meet the one or more designated operational parameters during ongoing monitoring thereof.

* * * * *